United States Patent
Purpura et al.

(10) Patent No.: US 8,985,693 B2
(45) Date of Patent: Mar. 24, 2015

(54) TRANSPORT VEHICLE UPRIGHT SLEEP SUPPORT SYSTEM

(71) Applicant: The Boeing Company, Chicago, IL (US)

(72) Inventors: William J. Purpura, Anaheim, CA (US); Paula K. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/973,118

(22) Filed: Aug. 22, 2013

(65) Prior Publication Data

US 2013/0341367 A1 Dec. 26, 2013

Related U.S. Application Data

(63) Continuation-in-part of application No. 13/287,886, filed on Nov. 2, 2011, now Pat. No. 8,528,978.

(51) Int. Cl.
| | | |
|---|---|---|
| *A47C 7/38* | (2006.01) | |
| *A45F 4/02* | (2006.01) | |
| *A45C 7/00* | (2006.01) | |
| *A45F 3/04* | (2006.01) | |
| *A45F 4/06* | (2006.01) | |
| *B64D 11/06* | (2006.01) | |

(52) U.S. Cl.
CPC . *A45F 4/06* (2013.01); *B64D 11/06* (2013.01); *B64D 2011/0668* (2013.01); *B64D 2011/0675* (2013.01)
USPC ........... 297/394; 297/392; 297/393; 297/397; 297/487; 297/488; 248/118; 224/153; 224/270; 224/275; 224/576; 224/581; 224/585; 224/586; 224/630

(58) Field of Classification Search
USPC .......... 297/394, 392, 397, 487, 488; 248/118; 224/153, 581, 270, 275, 576, 585, 586, 224/630
See application file for complete search history.

(56) References Cited

U.S. PATENT DOCUMENTS

| | | | | |
|---|---|---|---|---|
| 245,639 | A * | 8/1881 | Lay | 297/394 |
| 1,260,929 | A * | 3/1918 | Maccy | 297/394 |
| 4,097,086 | A * | 6/1978 | Hudson | 297/397 X |
| 4,249,712 | A * | 2/1981 | DeLong | 248/118 |
| 6,042,185 | A * | 3/2000 | Cowgur | 297/393 |
| 6,336,576 | B1 * | 1/2002 | Easter | 224/153 |
| 6,619,733 | B2 * | 9/2003 | Pearson | 297/488 X |
| 6,659,319 | B2 * | 12/2003 | Purpura | 224/576 |
| 6,684,431 | B2 * | 2/2004 | Splane, Jr. | 248/118 X |
| 6,796,473 | B2 * | 9/2004 | Purpura | 224/576 |
| 6,805,403 | B2 * | 10/2004 | Buch | 297/146 |
| 6,857,149 | B2 * | 2/2005 | Hoggatt et al. | 5/632 |
| 7,681,769 | B2 * | 3/2010 | Kramer | 224/581 |
| 7,748,064 | B2 * | 7/2010 | Hamilton | 297/394 X |
| 7,909,406 | B2 * | 3/2011 | Samuelsen | 297/397 |

(Continued)

*Primary Examiner* — Rodney B White
(74) *Attorney, Agent, or Firm* — Felix L. Fischer

(57) ABSTRACT

An upright sleep support system incorporates a head cushion having a face relief aperture to receive the eyes, nose, mouth and chin of a passenger placing his or her face against the head cushion with a hinged support structure for angular adjustment, sleeves that open in front to support the passengers arms, and a chest cushion on the back of the device. The chest cushion receives the passenger's chest in a forward leaning position. The head cushion is deployable from a backpack and the chest cushion is integrated into the back of the backpack.

19 Claims, 12 Drawing Sheets

(56) References Cited

U.S. PATENT DOCUMENTS

| | | | |
|---|---|---|---|
| 8,011,731 B2* | 9/2011 | Goddu | 297/397 |
| 8,333,308 B2* | 12/2012 | Maginness | 224/153 |
| 8,528,970 B2* | 9/2013 | Edalati et al. | 297/394 X |
| 8,528,978 B2* | 9/2013 | Purpura et al. | 297/394 |
| 8,584,283 B2* | 11/2013 | Mabry | 248/118 X |
| 2004/0026979 A1* | 2/2004 | Haddon | 297/393 |
| 2006/0138188 A1* | 6/2006 | Kramer | 224/581 |
| 2010/0230458 A1* | 9/2010 | Kramer | 224/581 |

* cited by examiner

TRANSPORT VEHICLE UPRIGHT SLEEP SUPPORT SYSTEM

REFERENCE TO RELATED APPLICATIONS

This application is a continuation in part of application Ser. No. 13/287,886 filed on Nov. 2, 2011 entitled TRANSPORT VEHICLE SEAT BACK WITH INTEGRATED UPRIGHT SLEEP SUPPORT SYSTEM and having a common assignee with the present application, the disclosure of which is incorporated herein by reference.

BACKGROUND INFORMATION

1. Field

Embodiments of the disclosure relate generally to the field of transport system seating and more particularly to an upright sleep support system portable in a backpack and supported by a transport vehicle seat.

2. Background

Vehicle transport seats, such as commercial airline seats, are often occupied by travelers for extended periods of time. Even though many transport seats recline to a certain extent, seating density prevents sufficient declination of the seat back for restful sleep. To accommodate sleeping in a vehicle seat several predominate options exist.

Using an aircraft seat as an example, but the following discussion is basically applicable to all other transportation vehicle seats, if seated in the window seat, the traveler can lean against the bulkhead and attempt to prop their head up with a pillow. This option is only available to passengers in window seats. Further, the window seats vary by location within the fuselage of the aircraft, and not all window seats are appropriate for this option. In order to utilize this option, the passenger must twist into an awkward pose that may in itself prevent the passenger from attaining a comfortable position or allow the passenger to be easily awakened by the movement of the vehicle. The vibration of the aircraft is more strongly felt by the passenger when leaning against the fuselage. While in the upright sleep position the passenger is more likely to fall forward and react to turbulence.

Alternatively the passenger uses a special neck pillow to support their head while trying to sleep in an upright position. The personal neck pillow, is also not a highly successful option due to the natural tendency of a sleeper to relax their muscles and fall to a more horizontal position, thus awakening the passenger. Many neck pillows use filling materials that shift or deform during use, and/or have non-breathable covers. Further, if an inflatable design, the pillow takes up less room during transport, but requires inflation at the beginning of use and deflation at the end of use.

Finally, the passenger can use the tray table from the seat back in front as a support surface on which they rest an object that raises the surface level to a point that the combination of tray table and object is high enough to support the passenger's arms and/or head as they lean against it for sleeping. This requires the use of the fold down tray table for support and is still only partially successful. This is due to fact that the space available to the passenger is at least partially determined by the person in the seat in front of them. If that person adjusts the angle of their own seat, the passenger leaning on the tray table will be awakened as a result. Additionally, this method, for most adults, requires the use of an object to bring the height of the tray table to the appropriate level. The seat back immediately forward may be reclined to a position leaving no room to place a support on the tray table. Further, depending on the size and composition of the pillow, the passenger's carry-on limit may be impacted. If an inflatable version is used it must be inflated and deflated. Additionally, the sleeper will either have their face flat against the support—which is uncomfortable, or will have to twist their head to the side—which can cause neck strain while sleeping. In either case, breathing while sleeping may also be interrupted. Finally, use of this method by a passenger not in the window seat will impact the ability of passengers nearer the window to enter & exit causing them to wake the sleeper. A self-supporting version of this option is disclosed in U.S. Pat. No. 6,973,691.

Various prior art devices have also been disclosed for constraining the head of a passenger to a seat head rest as disclosed in U.S. Pat. Nos. 5,806,933, 6,607,245, 6,523,901 and 8,007,046 and published application 20100171353.

It is therefore desirable to provide an integrated system attachable to vehicle transport seats for upright support of a seated passenger in a comfortable position for sleep.

SUMMARY

Embodiments disclosed herein provide a sleep support system housed in a backpack which incorporates a head cushion having a face relief aperture to receive the nose and chin of a passenger placing his or her face against the head cushion and a chest cushion with a hinged support structure for angular adjustment to a desired angle. When used herein the masculine or feminine employed singularly shall be interpreted to include both genders. The chest support receives the passenger's chest in a forward leaning position. Straps, disconnectable at a lower end from the backpack, extend over the shoulders of the passenger for attachment to a transportation vehicle seat.

In operation the embodiment provides a method for sleep support by storing the sleep support system in a compartment of a backpack with the head cushion, chest cushion, side supports and standoff supports substantially aligned. The straps on the backpack are disconnected at a lower end. The head cushion is deployed from the backpack and the angle between the head cushion and chest cushion is adjusted to a desired angle. The straps are secured over the passenger's shoulders to a transportation vehicle seat The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide an upright sleep support system in which the passenger's body, including their arms, is supported to prevent intrusion on the space of the person in the seat next to them and assures passengers will not be impacted if the seat in front of them reclines to its maximum range. The deployed sleeping support system cradles the head so the head and neck are fully supported and protected from violent vehicle movement without inhibiting breathing or vision. The sleeping support system adjusts for the passenger's body type, size and weight for maximum support and comfort while sleeping. The sleeping support system positions to keep the passenger erect, and less extended beyond the forward seat edge, allowing more room for seatmates to pass by a sleeper without waking them. Finally, the sleeping support system is portable allowing easy installation on any transportation seat.

Multifunctionality of the upright sleep support system is accomplished with a cushioned structure that fully supports the passenger's head at a natural angle. The body is cradled and the passenger's arms are supported for maximum comfort. The passenger gains full body stabilization and muscle relaxation, combined with an increased protection from unexpected body movement by leaning forward against a support system supporting both the head and chest, resulting in improved comfort and a significantly enhanced ability to sleep in an upright position. The embodiments disclosed are integrated into a modified conventional backpack or an LCTSS from which the head support is expanded and a support strap system attached to the seat back by mounting a cap to the top of the seat.

Figure 1:
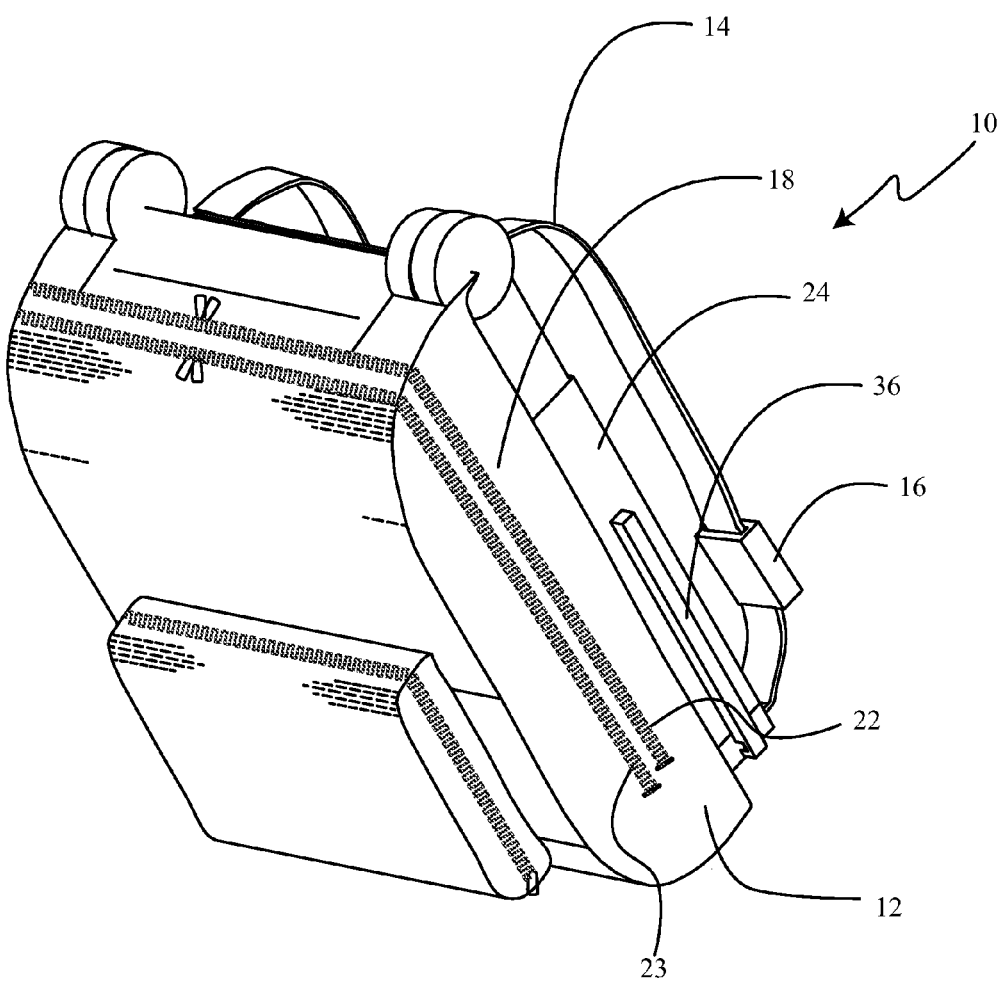
FIG. 1 is a pictorial representation of one embodiment of an upright sleep support system in an integral backpack.
Figure 2A:
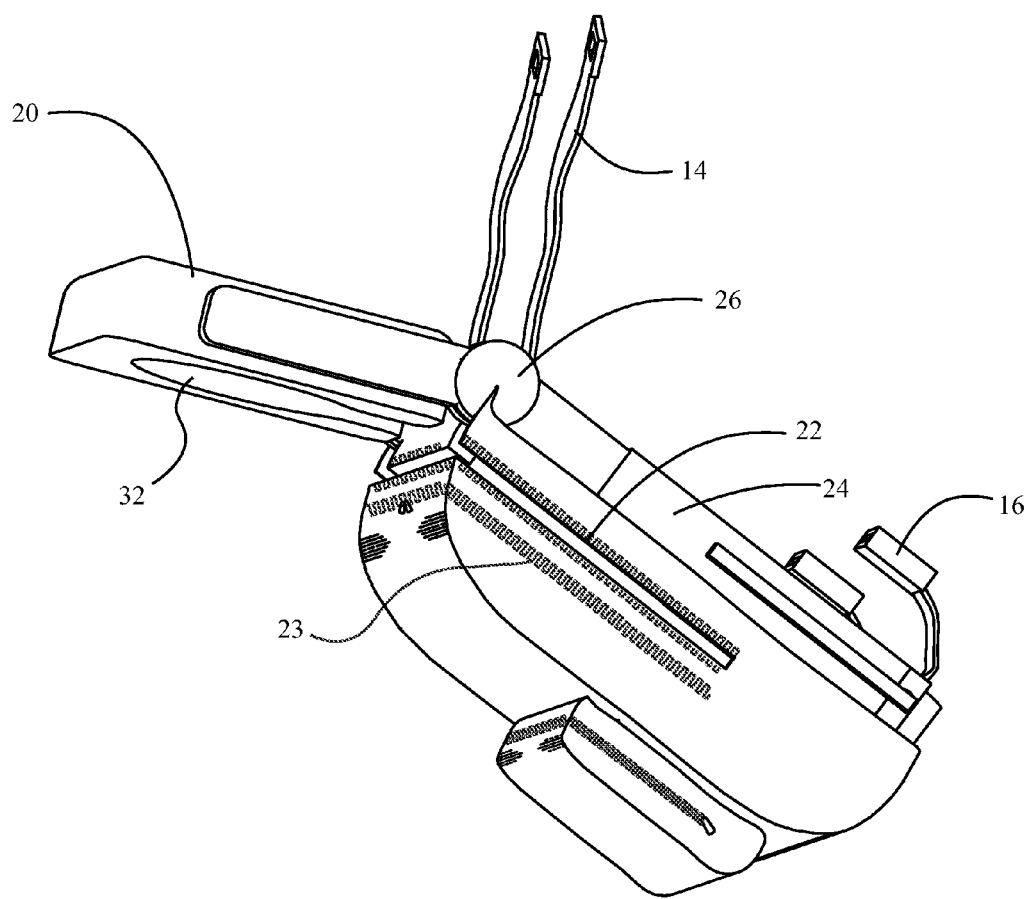
FIG. 2A is a front pictorial representation of the embodiment of FIG. 1 with the head cushion unfolded from the backpack on the hinged side structure and the straps disconnected from the integral buckles.

FIG. 1 is a pictorial representation of an exemplary embodiment of the sleep support system 10 incorporated in a conventional backpack 12 having straps 14 with connecting buckles 16 near a lower end of the strap which are releasable to free the straps 14 to secure to a transportation seat as will be described in greater detail subsequently. As shown in FIG. 2A, a head cushion 20 is attached with a hinged side structure 24. For the embodiment shown, the hinged side structure is external to the backpack 12. However, in alternative embodiments, the entire hinged side structure may be concealed within the cloth covering of a compartment 18 of the backpack 12. Additionally, while parallel, hinged side structure elements are shown, a single central telescoping support for the head cushion may be employed. The head cushion 20 is deployable from the compartment 18 by opening a first closure element 22 such as a zipper or Velcro® closure on the compartment 18 and rotating the head cushion 20 out of the compartment on hinges 26 attaching the head cushion 20 to the side structure 24. Hinges 26 may be self locking or may include a lever lock mechanism or similar device which is adjusted to alter the angle between the head cushion 20 and side structure 24 and then tightened to lock the head cushion 20 at a desired angle. Hinges described herein may be double hinges. A separately zippered septum in the front of compartment 18 or a separate external closure element 23 for general storage within the backpack 12 may be provided to avoid loss or disruption of stored contents during extraction of the head cushion 20 from compartment 18. If sufficient vertical length is available in the backpack 12, the head cushion and telescoping side structure 24 may be stored in vertical alignment and extended and retracted vertically from the backpack 12. While shown as folding forward into the backpack 12, the head cushion 20 may also fold rearward to lie flat against a rear surface of the backpack 12, with or without an enclosing cover.

Figure 2B:
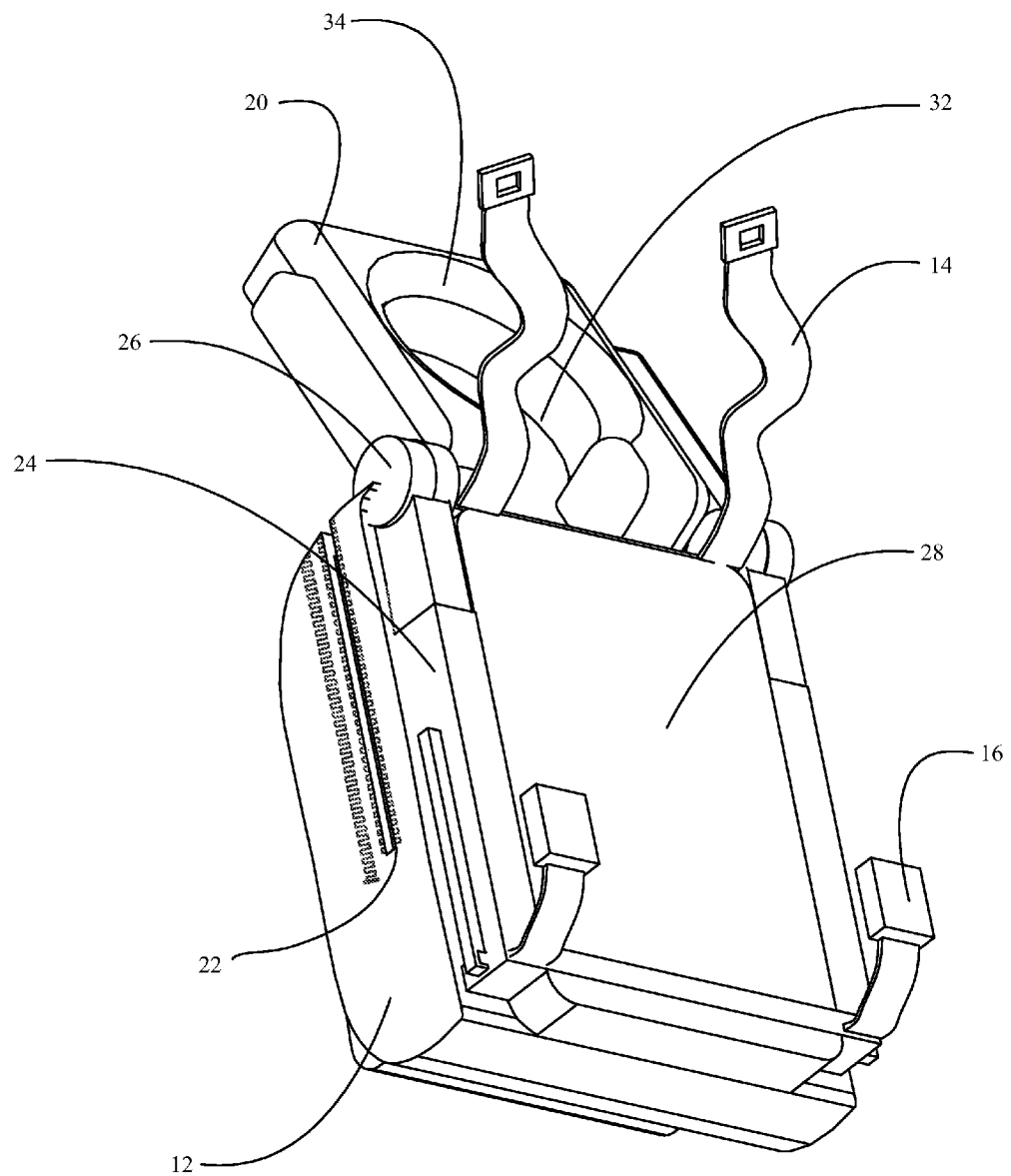
FIG. 2B is a rear pictorial representation of the embodiment of FIG. 1 with the head cushion unfolded from the backpack on the hinged side structure and the straps disconnected from the integral buckles.

A chest support cushion 28 is integral to or affixed on the rear surface of the main compartment 18 of the backpack 12 as shown in FIG. 2B. In certain embodiments, the chest support cushion may be a padded surface (that can include adaptations to adjust to male and female anatomy) created by the fabric of the backpack 12 In alternative embodiments, a foam insert, inflatable bladder, or other padding stored inside the backpack may be provided for additional support by being slipped into a sleeve found on the back surface of the backpack Straps 14 are attached to the backpack 12 proximate the side structure 24 to suspend the sleep support system from the seat as will be described in greater detail subsequently.

As seen in FIGS. 2A and 2B, the head cushion 20 incorporates a cutout 32 which accommodates the nose, eyes and chin of the passenger while supporting the forehead and cheeks in a relieved circumferential position 34. While shown as substantially circular for the embodiment in FIGS. 2A and 2B, the cutout may be ovaloid, triangular, rectangular or multi-lateral in alternative embodiments. Chest cushion 28 supports the chest at an angle adjusted to conform to the anatomical features of the passenger, as will be described in greater detail subsequently. This accommodates slim or more robust chest and stomach features and allows the passenger to lean forward against the chest cushion that comfortably supports the weight of the passenger. The adjustability of hinges 26 altering the relative angle between the head cushion 20 and chest cushion 28 (substantially parallel to the side supports 24) allows a comfortable angle to be established between the chest and head for complete support of the passenger in a forward resting position.

Figure 3:
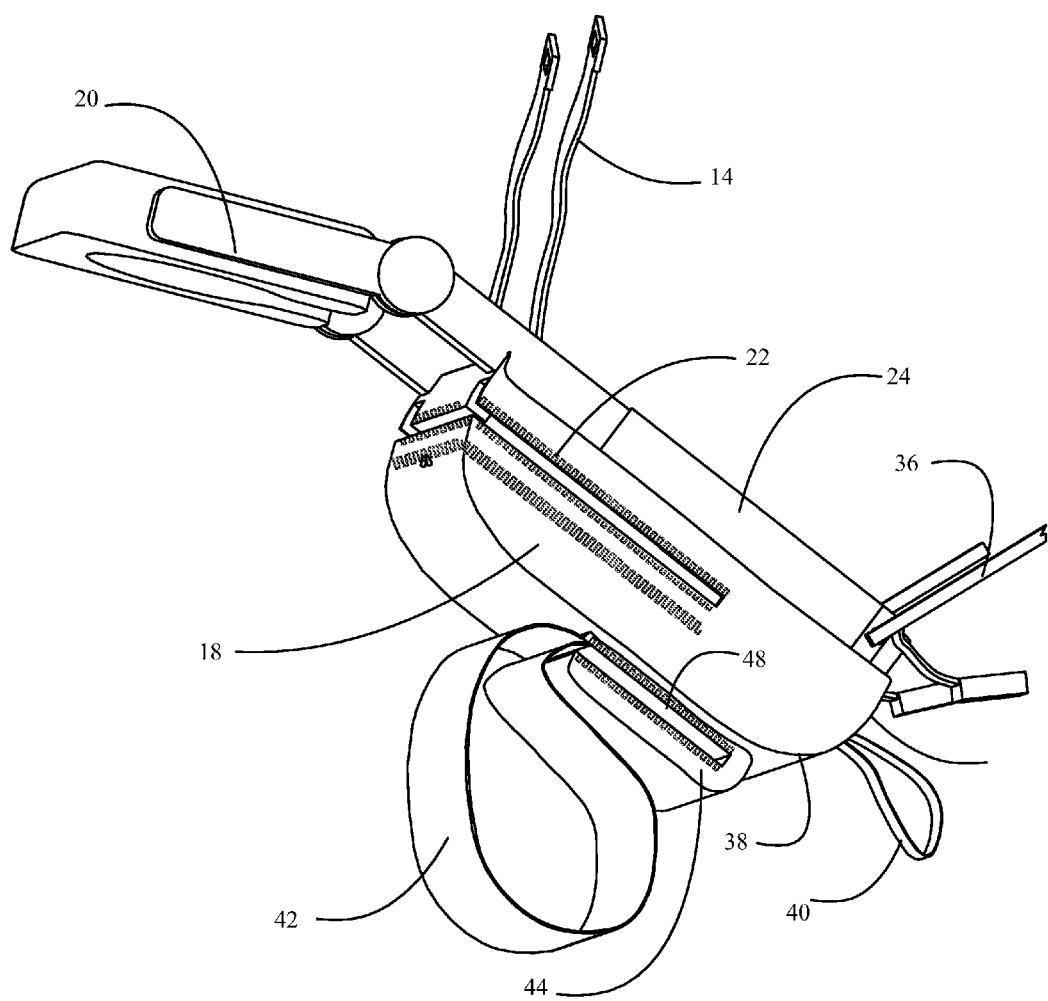
FIG. 3 is pictorial representation of the embodiment of FIG. 1 with the telescoping hinged side structure extended; the arm support cuff extended from the cuff compartment and the bottom standoffs rotated into support position.

Additional features of the embodiment are shown in FIG. 3 wherein standoff supports 36, rotatably mounted proximate to the bottom 38 of the backpack 12, are extended to be placed against the seat back to provide standoff room for the body of the sleeper while the upright sleep support system is being used. A stabilizing strap 40, also extending from the bottom 38 of the backpack is provided to allow a standard seat belt to be passed through and secured for additional stabilization of the upright sleep support system. An arm support sling 42 is deployable from, or an integral portion of a utility pouch 44 on the front of the main compartment 18 of the backpack 12. A second closure element 48 such as a zipper or Velcro® closure may be employed to close the utility pouch. In an alternative version as an integral portion of the utility pouch, zippered openings on each of the vertical sides of the utility pouch 44 may replace the single second closure element 48 to allow the passenger's arms to be thrust through from each side and thus supported.

Figure 4A:
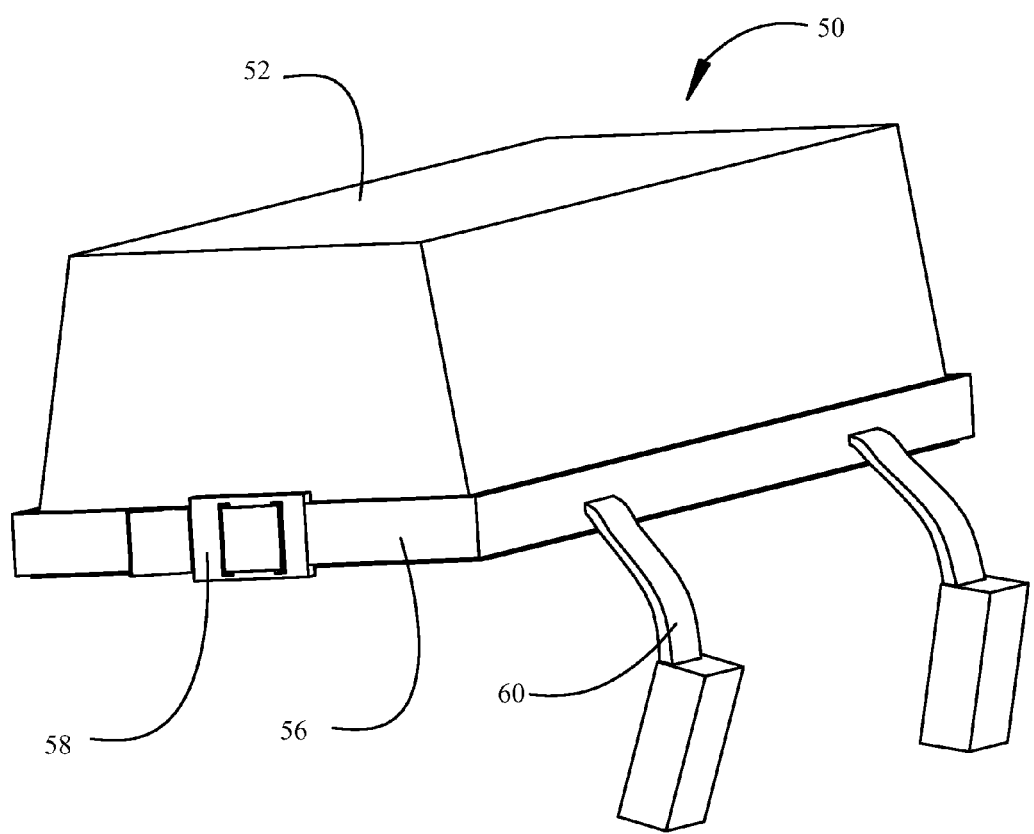
FIG. 4A is a pictorial representation of the seat top cap with the adjusting band and strap receiving buckles.

For engagement of the upright sleep system to a transportation vehicle seat, a cap 50 as shown in FIG. 4A is employed.

Figure 4B:
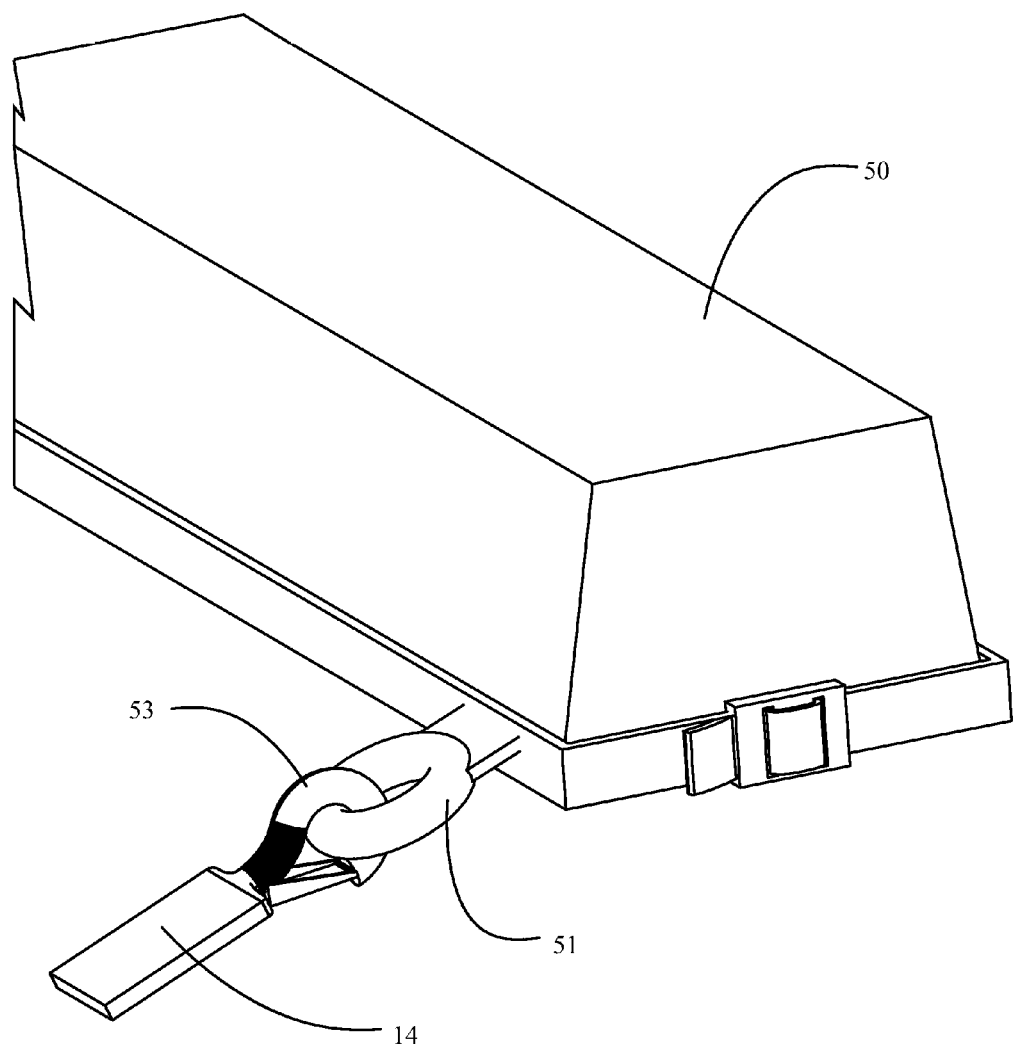
FIG. 4B is a detailed view of an alternative embodiment of the cap employing rings to receive self-locking hooks on the straps.
Figure 5:
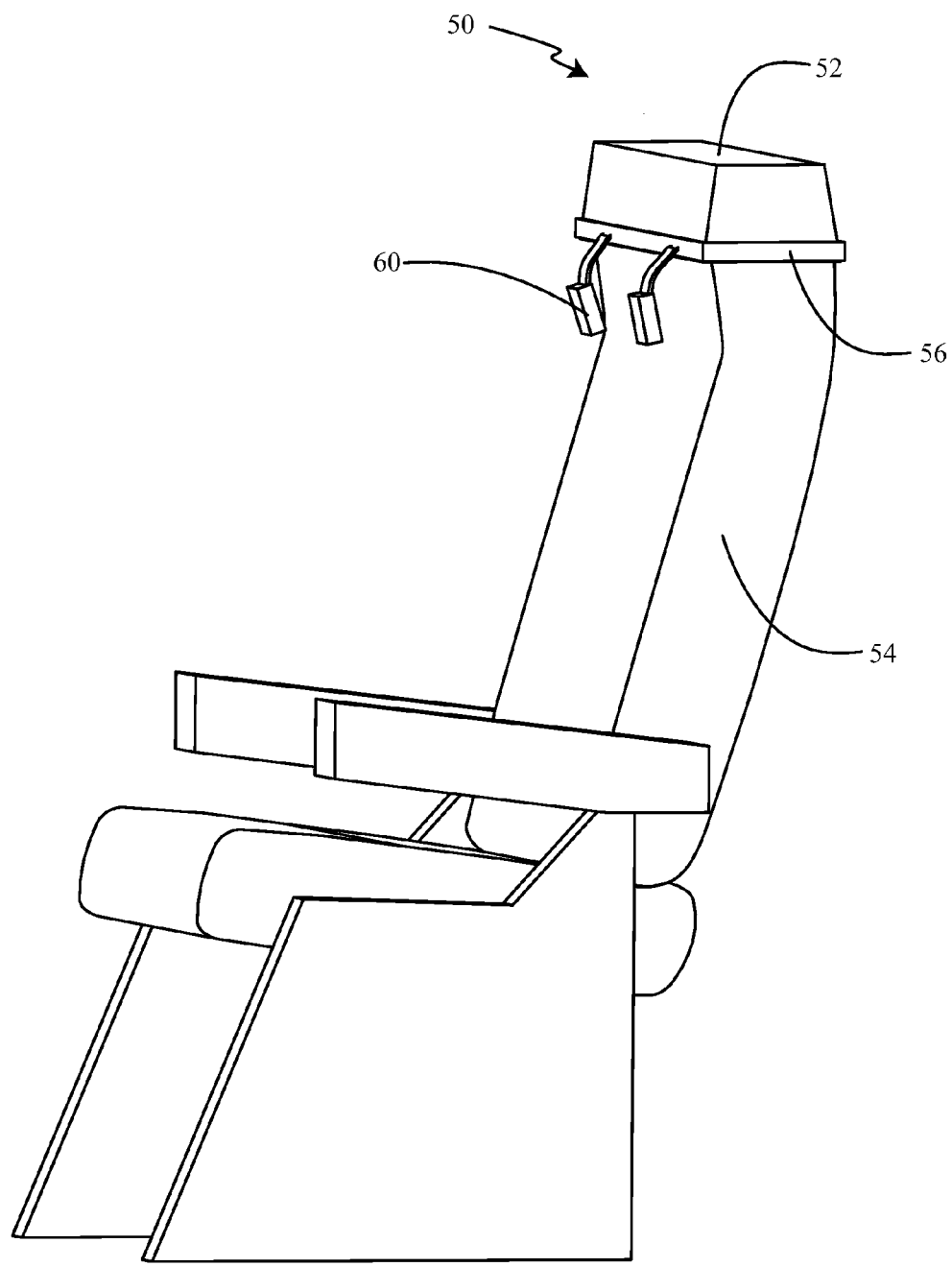
FIG. 5 is a pictorial representation of a typical transportation vehicle seat with the seat top cap installed.

The cap 50 may be stored in either the main compartment 18 or the utility pouch 44 and extracted for use. The cap 50 incorporates a fabric cap element 52 that is received over the top of a transportation vehicle seat 54 as shown in FIG. 5. A securing strap 56 having a tensioning buckle 58, or similar structure, is cinched around the seat top to secure the cap 50 on the seat 54. Mating buckles 60 are attached to the cap 50, on the securing strap 56 in the embodiment shown, and extend to engage the straps 14 which have been disengaged from the integral buckles 16 on the backpack 12. In alternative embodiments, the buckles may be replaced with rings 51 and receiving self-locking hooks 53 on the ends of the straps 14 or any similar connector or interconnection device to attach the straps to the cap as shown in FIG. 4B.

Figure 6:
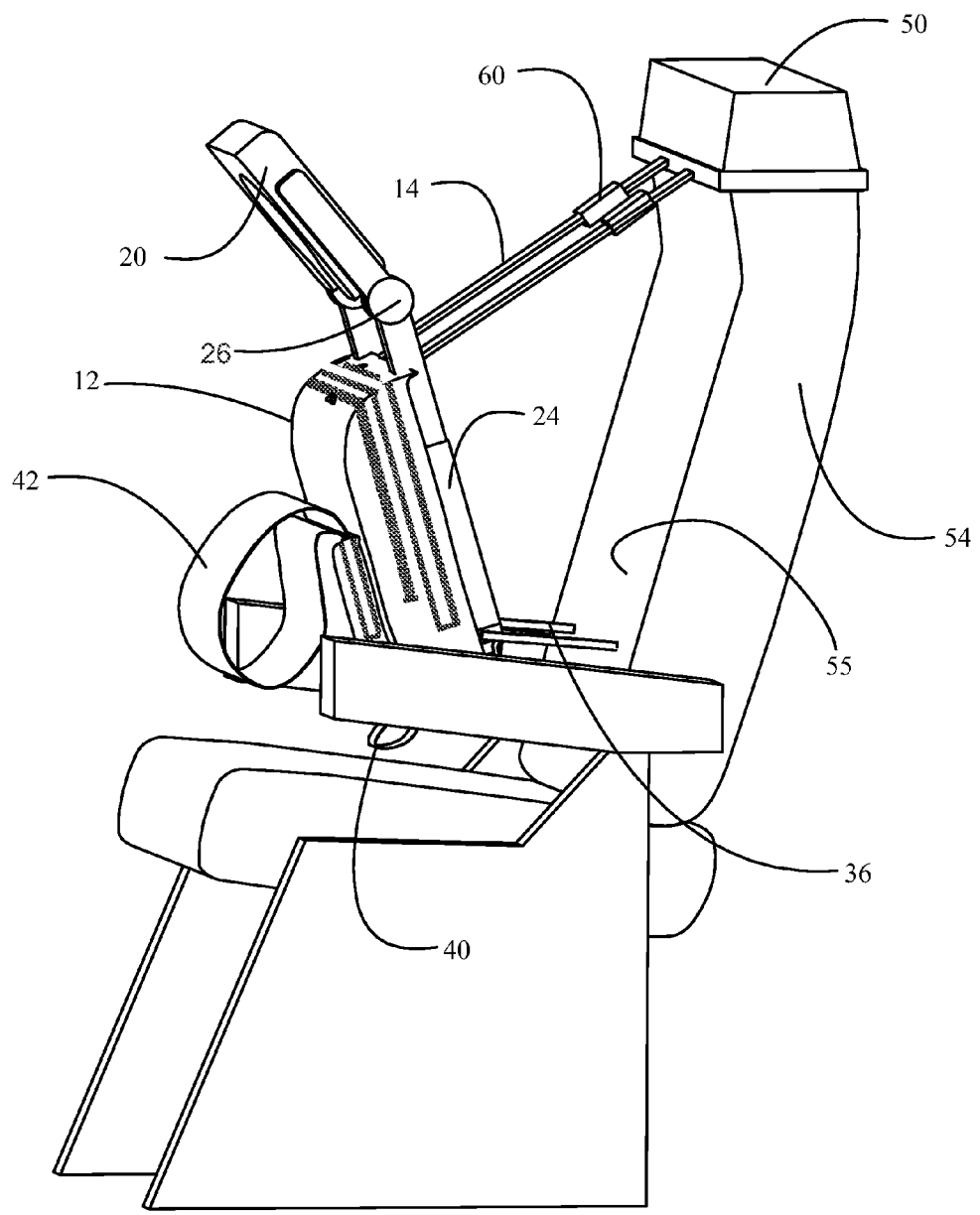
FIG. 6 is a pictorial representation of the deployed upright sleep support system in place in the seat.

As shown in FIG. 6, the fully deployed upright sleep support system 10 is positioned in front of the seated passenger (not shown to allow clarity of the elements of the embodiment). Straps 14 are secured to mating buckles 60 on the cap 50 extending over the shoulders of the passenger. The standoff supports 36 are rotated downward from the stored position shown in FIG. 1 to engage a back 55 of the seat 54. Standoff supports 36 may be telescopically adjustable to assist in orienting the upright sleep support system at a desired angle and to space the upright support sleep system away from the abdomen of the passenger. A standard seat belt on the transportation vehicle seat may be secured through the stabilizing strap 40 to further support and immobilize the upright sleep support system. The arms of the passenger are then received in the arm support sling 42 which supports the passenger's arms in a comfortable position.

Figure 7:
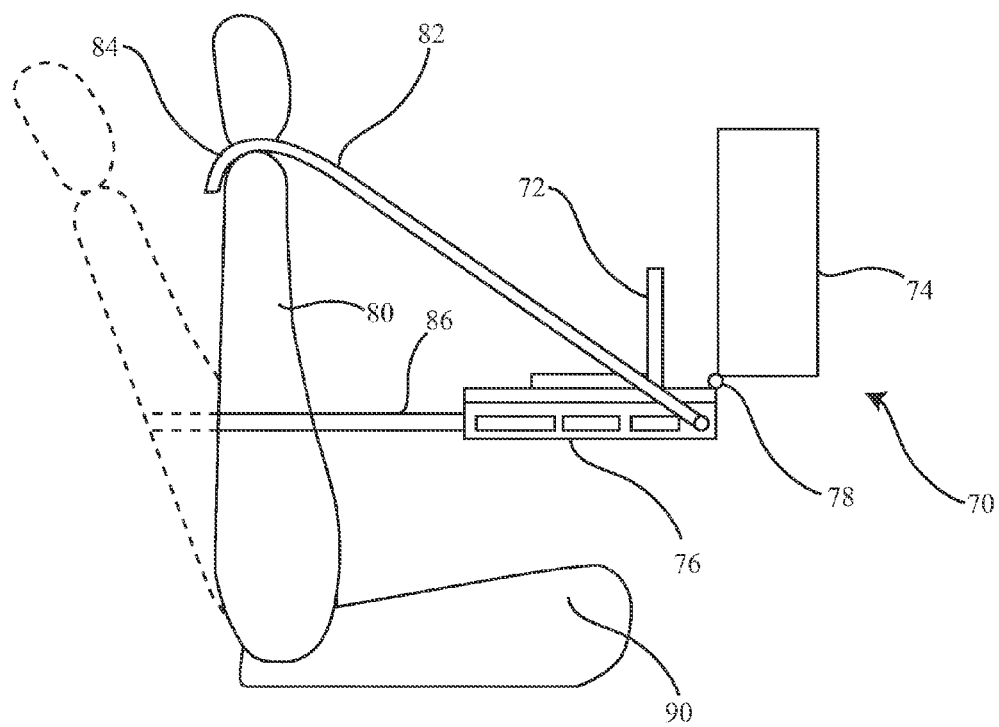
FIG. 7 is a side view of an alternative embodiment employing a laptop computer transport and support system (LCTSS) with the LCTSS engaged on a transportation seat and deployed for use of the laptop.
Figure 8:
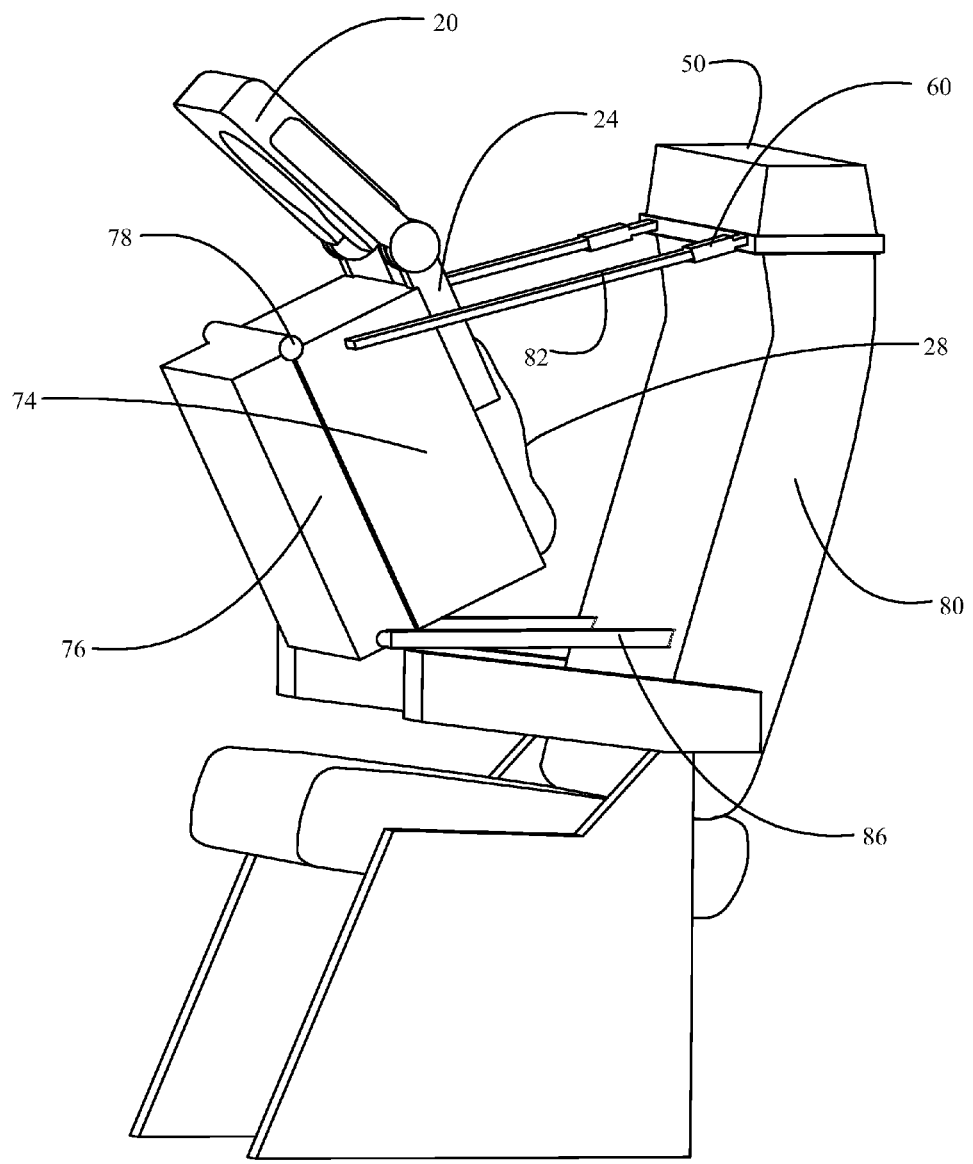
FIG. 8 is a pictorial view of the embodiment of FIG. 7 with the LCTSS closed on the laptop and the head cushion unfolded on the hinged side structure from the LCTSS; and, FIG. 9 is a flowchart showing operational deployment of the upright sleep system.

The upright sleep support system may also be incorporated in a laptop computer transport and support system (LCTSS), previously disclosed in U.S. Pat. Nos. 6,659,319 and 6,796,473 both entitled LAPTOP TRANSPORT AND SUPPORT SYSTEM FOR MOBILE ENVIRONMENTS and having a common assignee with the present application, the disclosures of which are incorporated herein by reference. As seen in FIG. 7, the LCTSS 70 provides a system for employing a laptop computer or similar device 72 in conjunction with a transportation vehicle seat 80. The LCTSS incorporates a cover 74 and a base 76 that pivot about a hinge 78. Shoulder straps 82 which are comparable to the straps 14 of the prior described embodiments are employed to carry the LCTSS in a folded condition as a backpack. Shoulder straps 82 are disconnected at a lower end from the base 76 to be attached to the transportation vehicle seat 80 using self-locking hooks 84 or buckle attachments comparable to the prior described embodiments, for connection to the seat. Standoffs 86 pivotally deployed from the base 76 separate the base from the seat back providing clearance for the passenger's abdomen. As shown in FIG. 8, the telescoping hinged side supports 24 and attached head cushion 20 may be attached to the cover 74 (or in alternative embodiments, the base 76) to be deployed with the cover and base in a closed position. A chest support cushion 28 is also placed on the cover 74. While shown as externally mounted to the cover for clarity, the side supports, head cushion and chest cushion may be stored internally to the cover or in a zippered enclosure on the cover until deployed. Deployment and adjustment of the head cushion 20 is substantially identical to the prior described embodiments. For the embodiment shown in FIG. 8, buckle attachments 60 with a seat cap 50 are employed for attachment of the straps 82 to the transportation vehicle seat 80 as in the prior embodiments.

For the embodiments as described, the head cushion 20 and/or the chest cushion 28 may be inflatable to allow more compact storage.

Figure 9:
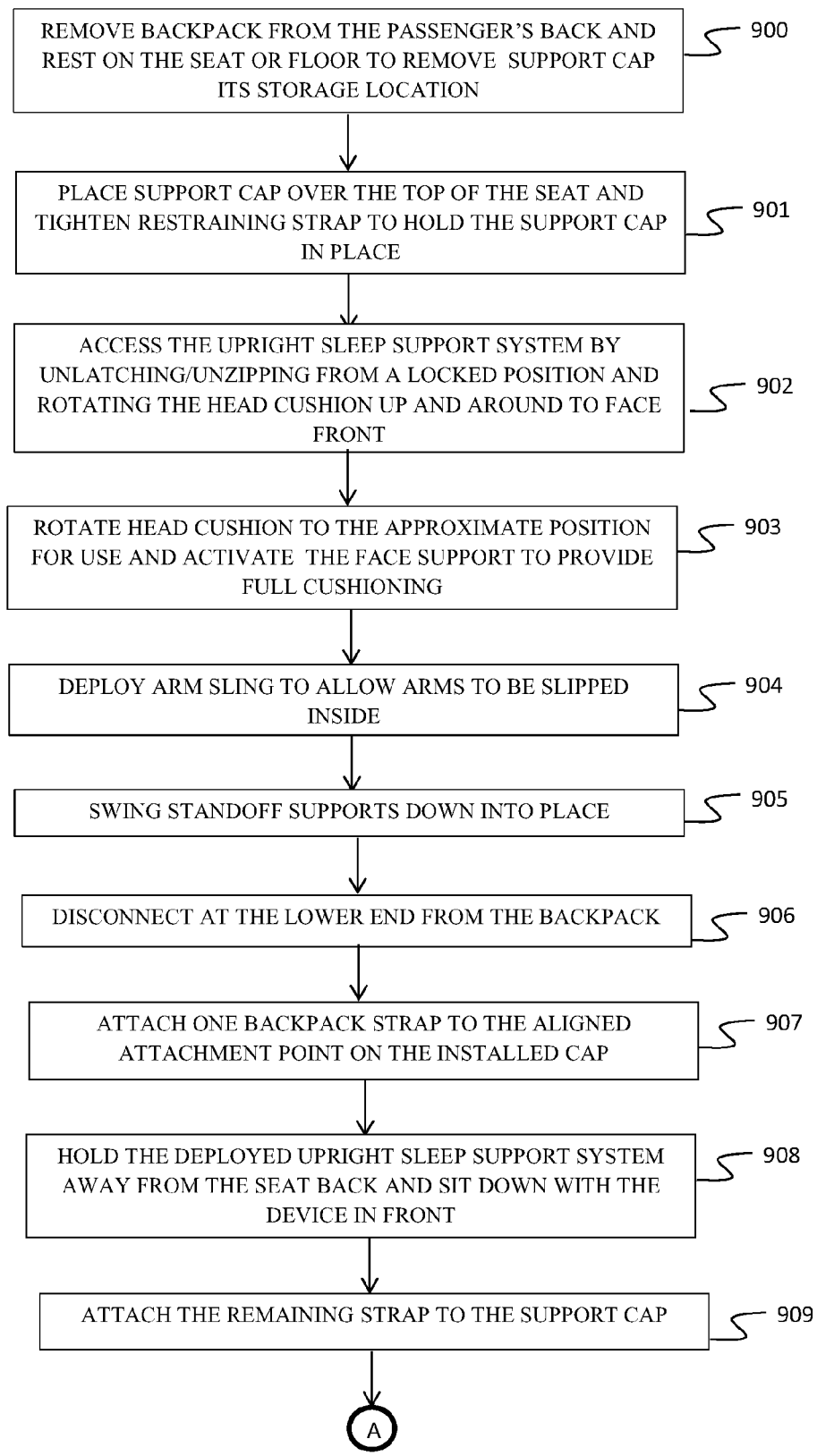
Figure 9:
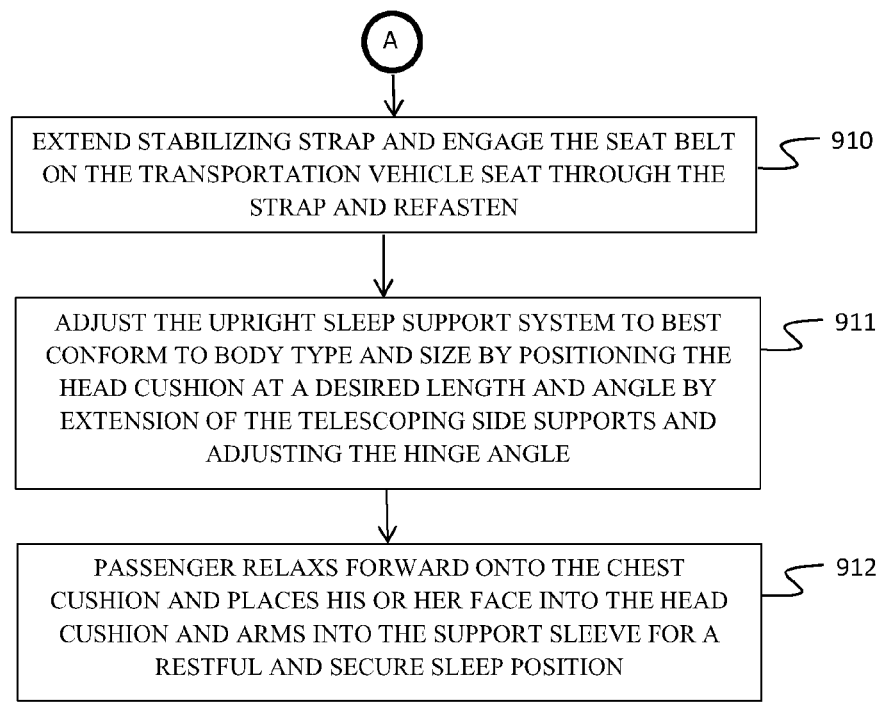

In operation any of the disclosed embodiments are similar. As shown in FIG. 9 The backpack is removed from the passenger's back and rested on the seat or floor so that the support cap can be removed from its storage location, step 900. The support cap is placed over the top of the seat and the restraining strap tightened to hold the support cap snuggly in place, Step 901. The upright sleep support system is accessed by either unlatching/unzipping it from its locked position and the head cushion is rotated up and then around to face front, if is stored on the back of backpack or accessed via a zippered slot at the top of the backpack and pulled out and then rotated forward, if it was stored inside the backpack, step 902. The head cushion is rotated to the approximate position for use and the face support is activated to provide full cushioning, step 903. The arm sling is deployed by unzipping the top of the storage pouch and flipping sleeve in front of the pouch or the two sides of the pouch are unzipped to allow the arms to be slipped inside the pouch where a sleeve prevents the pouch contents from slipping out of the unzipped sides, step 904. The standoff supports are swung down into place, step 905. The backpack straps are disconnected at the lower end from the backpack, step 906. The passenger attaches one of the backpack straps (selected based on access to the seat) to the aligned attachment point on the installed cap, step 907. With the unit partially attached, the passenger holds the deployed upright sleep support system away from the seat back and then sits down with the device in front of them, step 908. The passenger attaches the remaining strap to the support cap, step 909. The stabilizing strap is then extended and the seat belt on the transportation vehicle seat engaged through the strap and refastened, step 910. The passenger then adjusts the upright sleep support system to best conform to their body type and size by positioning the head cushion at a desired length and angle by extension of the telescoping side supports and adjusting the hinge angle, step 911. The passenger may then relax forward onto the chest cushion and place his or her face into the head cushion and arms into the support sleeve for a restful and secure sleep position, step 912.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An upright sleep support system comprising:
    a backpack having a main compartment and straps, said straps detachable from the backpack at a lower end and attachable to a transportation vehicle seat;
    a head cushion deployable from the backpack on side supports and adjustable at a desired angle to support a passenger's head;
    a chest cushion on the backpack; and,
    standoff supports positionably extending from a lower portion of the backpack providing clearance for a passenger's abdomen.

2. The upright sleep support system as defined in claim 1 further comprising at least one hinge that joins and pivotably adjusts the head cushion relative to side supports attached to the main compartment of the backpack.

3. The upright sleep support system as defined in claim 1 further comprising an arm support sling deployable from a front of the backpack and configured to support both said passenger's arms when the sling is deployed.

4. A sleep support system comprising:
    a head cushion deployable from a backpack and having a face relief aperture to receive a passenger's face leaving the eyes, nose mount and chin unrestricted when the face is supported by the head cushion;

a chest cushion attached to the backpack;

a hinged support structure for angular adjustment between said head cushion and said chest cushion, said chest cushion receiving the passenger's chest in a forward leaning position; and, a pair of straps, each said strap having one end attached to an upper end of the backpack and a second end detachably connected to connecting buckles at a lower end of the backpack for placement on a person's shoulders to carry the sleep support system in a folded condition as a backpack; said straps being detachable from said connecting buckles at the lower end of the backpack and adapted to extend over a passenger's shoulders and attach to a transportation vehicle seat by mating fasteners.

5. The sleep support system of claim 4 wherein the hinged support structure comprises a pair of side supports attached to the head cushion and backpack and each having a hinge intermediate the head cushion and chest cushion.

6. The sleep support system of claim 5 wherein the head cushion is deployable from a main compartment in the backpack.

7. The sleep support system of claim 4 wherein the side supports are telescoping.

8. The sleep support system of claim 4 further comprising an arm support sling attached to said backpack.

9. The sleep support system of claim 8 wherein the arm support sling is deployable from a utility pouch on a front of the backpack.

10. The sleep support system of claim 4 further comprising standoff supports positionably deployable from a lower portion of the backpack providing clearance for a passenger's abdomen.

11. The sleep support system of claim 4 further comprising a stabilizing strap extendible from a bottom of the backpack to engage a seat belt on the transportation vehicle seat.

12. The sleep support system of claim 4 wherein the head cushion is foldably collapsible to be received in a main compartment in the backpack and further comprising standoff supports positionably extending from a lower portion of the backpack providing clearance for a passenger's abdomen and rotatable for deployment from a stored to an extended position.

13. The sleep support system of claim 4 further comprising a cap received over a top of the transportation vehicle seat and having connectors to engage the straps.

14. The sleep support system of claim 13 wherein the straps are engaged at a lower end to the backpack with buckles and the connectors on the cap are buckles.

15. The sleep support system of claim 13 in which the straps terminate in hooks and the connectors on the cap comprise rings to receive said hooks ends for mating attachment to the transportation vehicle seat.

16. A method for deployment of a sleep support system having a head cushion, deployable from a backpack and a chest cushion on the backpack, a side support structure attached to a main compartment of the backpack, standoff supports positionably deployable from a lower portion of the backpack, an arm support sling deployable from a front of the backpack and a stabilizing strap extendible from a bottom of the backpack, said method comprising:

storing the sleep support system in a compartment of a backpack with the head cushion, chest cushion, side supports and standoff supports substantially aligned;

disconnecting straps on the backpack at a lower end;

deploying the head cushion from the backpack;

adjusting an angle between the head cushion and chest cushion to a desired angle; and, securing the straps over a passenger's shoulders to a transportation vehicle seat.

17. The method of claim 16 further comprising telescopically extending the head cushion on the side supports.

18. The method of claim 16 further comprising deploying a flexible arm sling to receive a passenger's arms.

19. The method of claim 16 further comprising;

rotating standoff supports to engage the transportation vehicle seat to space the backpack from a passenger's abdomen; and, engaging a securing strap with a seat belt on the transportation vehicle seat.

* * * * *